US007343747B2

(12) United States Patent
Müller et al.

(10) Patent No.: US 7,343,747 B2
(45) Date of Patent: Mar. 18, 2008

(54) METAL-ORGANIC FRAMEWORK MATERIALS FOR GASEOUS HYDROCARBON STORAGE

(75) Inventors: Ulrich Müller, Neustadt (DE); Michael Hesse, Worms (DE); Hermann Pütter, Neustadt (DE); Omar M. Yaghi, Ann Arbor, MI (US)

(73) Assignees: BASF Aktiengesellschaft, Ludwigshafen (DE); The Regents of the University of Michigan, Ann Arbor, MI (US)

( * ) Notice: Subject to any disclaimer, the term of this patent is extended or adjusted under 35 U.S.C. 154(b) by 415 days.

(21) Appl. No.: 11/062,861

(22) Filed: Feb. 23, 2005

(65) Prior Publication Data

US 2006/0185388 A1 Aug. 24, 2006

(51) Int. Cl.

| | |
|---|---|
| ***F17C 3/08*** | (2006.01) |
| ***B01D 59/26*** | (2006.01) |
| ***B01D 53/02*** | (2006.01) |

(52) U.S. Cl. .......................... 62/45.1; 96/148; 502/500

(58) Field of Classification Search ................. 62/46.3, 62/45.1; 96/148; 502/500

See application file for complete search history.

(56) References Cited

U.S. PATENT DOCUMENTS

| | | | | |
|---|---|---|---|---|
| 4,523,548 | A | 6/1985 | Engel et al. | |
| 4,531,558 | A | 7/1985 | Engel et al. | |
| 5,094,736 | A | 3/1992 | Greenbank | |
| 5,648,508 | A * | 7/1997 | Yaghi | 556/9 |
| 6,561,213 | B2 * | 5/2003 | Wang et al. | 137/263 |
| 6,929,679 | B2 * | 8/2005 | Muller et al. | 95/90 |
| 7,009,066 | B2 * | 3/2006 | Kitagawa et al. | 556/32 |
| 2003/0148165 | A1 | 8/2003 | Mueller et al. | |
| 2004/0225134 | A1 * | 11/2004 | Yaghi et al. | 549/211 |
| 2005/0004404 | A1 | 1/2005 | Mueller et al. | |

OTHER PUBLICATIONS

U.S. Appl. No. 11/062,861, filed Feb. 23, 2005, Mueller et al.
U.S. Appl. No. 10/580,407, filed May 24, 2006, Mueller et al.

* cited by examiner

*Primary Examiner*—William C Doerrler
(74) *Attorney, Agent, or Firm*—Oblon, Spivak, McClelland, Maier & Neustadt, P.C.

(57) ABSTRACT

The present invention relates to a method of storing a liquefied gas in a container containing a metal-organic framework material, the container filled with such a gas, a process for filling container and the use of the container to release the gas.

9 Claims, 3 Drawing Sheets

METAL-ORGANIC FRAMEWORK MATERIALS FOR GASEOUS HYDROCARBON STORAGE

The present invention relates to a method of storing a liquefied gas in a container containing a metal-organic framework material, the container filled with such a gas, a process for filling container and the use of the container to release the gas.

Liquefied gas, especially propane or mixtures of propane and butane, is often used as portable fuel supply. Therefore, the gas is stored in a pressure resistant bottle or tank under a pressure which is high enough to store the gas in the bottle or tank in its liquid status. The liquefied gases are characterized by having a boiling point which is in the range of about −50° C. to about 10° C. Therefore, normally a pressure of 20 bar or higher is necessary to convert the gases to their liquid state at room temperature.

However, there is a demand for the storage of gases which are normally considered as liquefied gases under a pressure which is less than the aforementioned minimum pressure to keep the gases in their liquid state. One of the most important reasons is caused by safety provisions for pressurized vessels.

Conventional bottles or the like do not provide sufficient space to efficiently store the gases in the low pressure range.

Other ways to store gases are given by absorbing the desired gas in a porous material. Such material may be of inorganic nature like zeolites or of organic nature like metal organic frameworks (MOF).

US 2003/0148165 A1 describes in general the storage of gases using MOFs.

There is a demanding need to provide methods to suitably store liquefied gases in their gaseous state at a low pressure range.

Thus, the object of the invention is to provide a method for storing gases known as liquefied gases in their gaseous state in a low pressure range in amounts which are sufficiently high.

The object is solved by a method of storing a liquefied gas in a container having an entrance opening and optionally a separate exit opening for allowing the liquefied gas to enter or exit the container and a gas-tight maintaining mechanism capable of maintaining the liquefied gas in its gaseous state in a predefined amount and under a predefined pressure inside the container and containing a metal-organic framework material (MOF) comprising at least one metal ion and at least one at least bidentate organic compound, which is coordinately bound to said metal ion, wherein the ratio of the pressure in the container to a pressure necessary for the storage of the same amount of liquefied gas at the same temperature in the container without comprising the MOF is at most 0.2.

Surprisingly, it was found that a container comprising a MOF can uptake an unexpected high amount of liquefied gas compared to the situation where no MOF is used. This affords the storage of an efficiently high amount of liquefied gas in a low pressure range using an at least 5-fold lower pressure.

Figure 1:
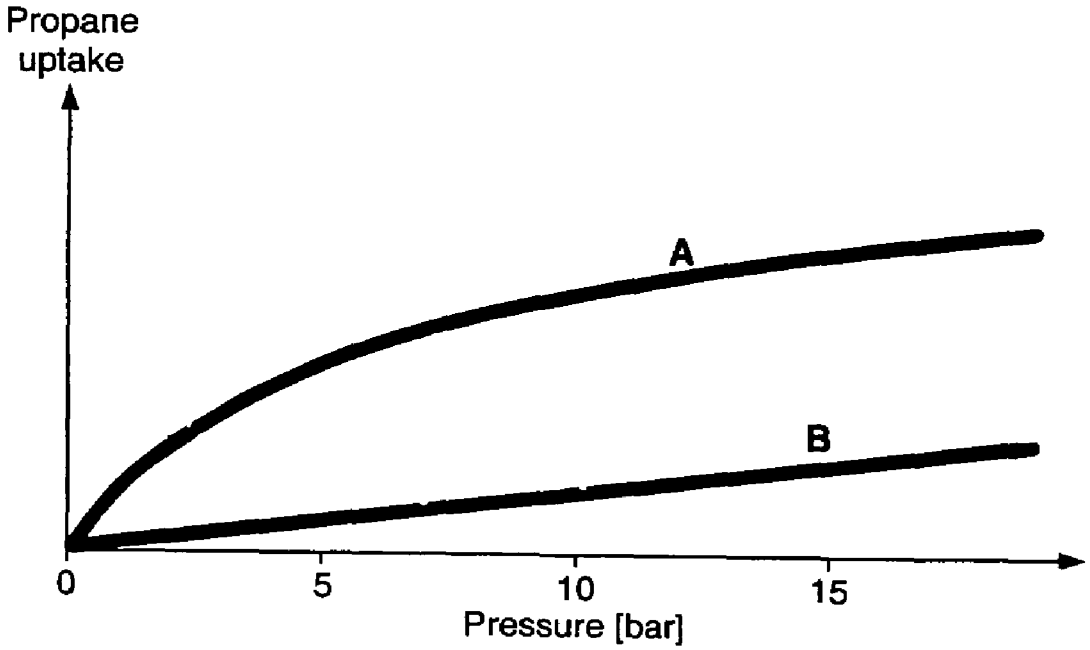

FIG. 1 shows the general curve progression of the uptake of a liquefied gas (here: propane as an example) in a container with (curve A) and without (curve B) a MOF.

Within the meaning of the present invention the term “liquefied gas” preferably indicates a gas or mixture of different gases which can be converted in their liquid state under a pressure of up to 40 bar depending on the temperature, however, room temperature is preferred. Moreover, according to the present invention the term “liquefied gas” does not automatically indicate a gas in its liquefied status.

Properties of gases important in industrial applications, compressed gases, gas containers used and handling instructions can be referred to in ‘Handbook of Compressed Gases’, $3^{rd}$ Edition, Van Nostrand Reinhold, N.Y., 1989 and are incorporated herein by reference.

Preferably, the liquefied gas is selected from the group consisting of halogenated $C_1$-$C_{10}$ hydrocarbon, propane, butane, isobutane and mixtures thereof. More preferred the liquefied gas is propane.

Due to the low pressure range used according to the present invention the shape and material of the container does not necessarily fulfil the requirements of pressurized vessels. Preferably, the container according to the present invention is of a non-cylidrical shape. The container material does not necessarily consist of stainless steel.

The container comprises an entrance opening and optionally a separate exit opening for allowing the liquefied gas to enter or exit the container and a gas-tight maintaining mechanism capable of maintaining the liquefied gas. Preferably the entrance and exit opening are the same equipped with a conventional valve used as the gas-tight maintaining mechanism.

In a preferred embodiment the pressure is more than 0.1 bar and less than 20 bar. More preferably, the pressure is more than 1 bar and less than 20 bar, even more preferred more than 1 bar and less than 10 bar.

The amount of liquefied gas in the container is at least 2 g/l.

The ratio of the pressure in the container to a pressure necessary for the storage of the same amount of liquefied gas at the same temperature in the container without comprising the MOF is at most 0.2. Preferably, the ratio is at most 0.1 and more preferred at most 0.05.

Another aspect of the present invention is a container filled with liquefied gas in a predefined amount and under a predefined pressure having an entrance opening and optionally a separate exit opening for allowing the liquefied gas to enter or exit the container and a gas-tight maintaining mechanism capable of maintaining the liquefied gas in its gaseous state in a predefined amount and under a predefined pressure inside the container and containing a metal-organic framework material (MOF) comprising at least one metal ion and at least one at least bidentate organic compound, which is coordinately bound to said metal ion, wherein the ratio of the pressure in the container to a pressure necessary for the storage of the same amount of liquefied gas at the same temperature in the container without comprising the MOF is at most 0.2.

Yet another aspect of the present invention is a process for filling a container having an entrance opening and optionally a separate exit opening for allowing the liquefied gas to enter or exit the container and a gas-tight maintaining mechanism capable of maintaining the liquefied gas in its gaseous state inside the container and containing a metal-organic framework material (MOF) comprising at least one metal ion and at least one at least bidentate organic compound, which is coordinately bound to said metal ion, with a liquefied gas up to a predefined amount and a predefined pressure so that the ratio of the pressure in the container to a pressure necessary for the storage of the same amount of liquefied gas at the same temperature in the container without comprising the MOF is at most 0.2, comprising the step contacting the entrance opening of the container with a bottle of the liquefied gas, wherein the gas is in its liquid state or compressed state, such that the pressure in the feed container exceeds the pressure in the container which is to be filled.

Yet another aspect of the present invention is the use of a container according to the present invention for the controlled release of liquefied gas.

Suitable MOFs are in known in the art. They can be used as powder but preferably, the MOFs are used as shaped bodies, more preferred as extrudates or tablets.

The MOF containing powder has a fine powdery to powdery grain size and may contain or consist of crystallites (small crystals). According to the present invention the term "powder" is used for all forms described above as well as mixtures thereof. The maximum grain size of the powder is preferably less than 0.2 mm for each direction.

The shaped body can have any form suitable for the planned use. Preferably, it is pellet, tablet or bar shaped. In the context of the present invention, the term "shaped body" preferably refers to any solid body that extends to at least 0.2 mm in at least one direction in space. No other restrictions apply, i.e., the body may take any conceivable shape and may extend in any direction by any length so long as it preferably extends to at least 0.2 mm in one direction. In a more preferred embodiment, the shaped bodies do not extend to more than 50 mm and not to less than 0.2 mm in all directions. In a further preferred embodiment, this range is limited from 1 mm to 16 mm, preferably from 1.5 mm to 5 mm.

As far as the geometry of these shaped bodies is concerned, spherical or cylindrical bodies are also preferred, as well as disk-shaped pellets or any other suitable geometry such as honeycombs, meshes, hollow bodies, wire arrangements etc.

The MOF containing powder includes a metal-organic framework material which is built up from metal ions and at least bidentate organic compounds coordinately bound to said metal ion. The MOF as such comprises cavities which are accessible by pores. One cavity is defined by eight metal ions linked together by at least bidentate organic compounds.

As has been mentioned above, the MOF is described in, for example, U.S. Pat. No. 5,648,508, EP-A-0 709 253, M. O'Keeffe et al., *J. Sol. State Chem.,* 152 (2000) p. 3-20, H. Li et al., *Nature* 402 (1999) p. 276 seq., M. Eddaoudi et al., *Topics in Catalysis* 9 (1999) p. 105-111, B. Chen et al., *Science* 291 (2001) p. 1021-23 and DE-A-101 11 230.

The MOFs, as used in the present invention, comprise pores, particularly micro- and/or mesopores. Micropores are defined as being pores having a diameter of 2 nm or below and mesopores as being pores having a diameter in the range of 2 nm to 50 nm, according to the definition given in *Pure Applied Chem.* 45, p. 71 seq., particularly on p. 79 (1976). The presence of the micro- and/or mesopores can be monitored by sorption measurements which determine the capacity of the metal-organic framework materials for nitrogen uptake at 77 K according to DIN 66131 and/or DIN 66134.

For example, a type-I-form of the isothermal curve indicates the presence of micropores [see, for example, paragraph 4 of M. Eddaoudi et al., *Topics in Catalysis* 9 (1999)]. In a preferred embodiment, the specific surface area, as calculated according to the Langmuir model (DIN 66131, 66134, 66135) preferably is above 5 $m^2/g$, more preferred above 10 $m^2/g$, even more preferably above 50 $m^2/g$, even more preferred above 500 $m^2/g$, even more preferred above 1000 $m^2/g$, even more preferred above 1500 $m^2/g$, even more preferred above 2500 $m^2/g$ and may increase into the region above 4500 $m^2/g$.

Shaped bodies can have a lower specific surface area but preferably, is above 10 $m^2/g$, more preferred above 50 $m^2/g$ and most preferred above 500 $m^2/g$.

As to the metal component within the framework material that is to be used according to the present invention, particularly to be mentioned are the metal ions of the main group elements and of the subgroup elements of the periodic system of the elements, namely of the groups Ia, IIa, IIIa, IVa to VIIIa and Ib to VIb. Among those metal components, particular reference is made to Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, and Bi, more preferably to Zn, Cu, Ni, Pd, Pt, Ru, Rh and Co and most preferred Zn and Cu. As to the metal ions of these elements, particular reference is made to: Mg , $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^{+}$, $Ir^{2+}$, $Ir^{+}$, $Ni^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{+}$, $As^{3+}$, $As^{+}$, $Sb^{5+}$, $Sb^{3+}$, $Sb^{+}$, $Bi^{5+}$, $Bi^{3+}$ and $Bi^{+}$.

With regard to the preferred metal ions and further details regarding the same, particular reference is made to: U.S. Pat. No. 5,648,508, particularly to col. 11, line 11 to 51, section "The Metal Ions", which section is incorporated herein by reference.

In addition to the metal salts disclosed in EP-A 0 790 253 and U.S. Pat. No. 5,648,508, other metallic compounds can be used, such as sulfates, phosphates and other complex counter-ion metal salts of the main- and subgroup metals of the periodic system of the elements. Metal oxides, mixed oxides and mixtures of metal oxides and/or mixed oxides with or without a defined stoichiometry are preferred. All of the above mentioned metal compounds can be soluble or insoluble.

As to the at least bidentate organic compound, which is capable of coordination with the metal ion, in principle all compounds can be used which are suitable for this purpose and which fulfill the above requirements of being at least bidentate. Said organic compound must have at least two centers, which are capable to coordinate the metal ions of a metal salt, particularly with the metals of the aforementioned groups. With regard to the at least bidentate organic compound, specific mention is to be made of compounds having i) an alkyl group substructure, having from 1 to 10 carbon atoms, ii) an aryl group substructure, having from 1 to 5 phenyl rings, iii) an alkyl or aryl amine substructure, consisting of alkyl groups having from 1 to 10 carbon atoms or aryl groups having from 1 to 5 phenyl rings, said substructures having bound thereto at least one at least bidentate functional group "X", which is covalently bound to the substructure of said compound, and wherein X is selected from the group consisting of $CO_2H$, $CS_2H$, $NO_2$, $SO_3H$, $Si(OH)_3$, $Ge(OH)_3$, $Sn(OH)_3$, $Si(SH)_4$, $Ge(SH)_4$, $Sn(SH)_3$, $PO_3H$, $AsO_3H$, $AsO_4H$, $P(SH)_3$, $As(SH)_3$, $CH(RSH)_2$, $C(RSH)_3$, $CH(RNH_2)_2$, $C(RNH_2)_3$, $CH(ROH)_2$, $C(ROH)_3$, $CH(RCN)_2$, $C(RCN)_3$, wherein R is an alkyl group having from 1 to 5 carbon atoms, or an aryl group consisting of 1 to 2 phenyl rings, and $CH(SH)_2$, $C(SH)_3$, $CH(NH_2)_2$, $C(NH_2)_2$, $CH(OH)_2$, $C(OH)_3$, $CH(CN)_2$ and $C(CN)_3$.

Particularly to be mentioned are substituted or unsubstituted, mono- or polynuclear aromatic di-, tri- and tetracarboxylic acids and substituted or unsubstituted, at least one hetero atom comprising aromatic di-, tri- and tetracarboxylic acids, which have one or more nuclei.

Preferred ligands are ADC (acetylene dicarboxylate), NDC (naphtalene dicarboxylate), BDC (benzene dicarboxylate), ATC (adamantane tetracarboxylate), BTC (benzene tricarboxylate), BTB (benzene tribenzoate), MTB (methane tetrabenzoate) and ATB (adamantane tribenzoate). More preferred bidentate ligands are 1,2,3,- and 1,3,5-benzene tricarboxylic acid (BCT), iosphtalic acid, terephtalic acid, 2,5-dihydroxy-terephtalic acid and 2,2'-bipyridine-5,5'-dicarboxylic acid.

Besides the at least bidentate organic compound, the framework material as used in accordance with the present invention may also comprise one or more mono-dentate ligand(s), which is/are preferably selected from the following mono-dentate substances and/or derivatives thereof:

a. alkyl amines and their corresponding alkyl ammonium salts, containing linear, branched, or cyclic aliphatic groups, having from 1 to 20 carbon atoms (and their corresponding ammonium salts);
b. aryl amines and their corresponding aryl ammonium salts having from 1 to 5 phenyl rings;
c. alkyl phosphonium salts, containing linear, branched, or cyclic aliphatic groups, having from 1 to 20 carbon atoms;
d. aryl phosphonium salts, having from 1 to 5 phenyl rings;
e. alkyl organic acids and the corresponding alkyl organic anions (and salts) containing linear, branched, or cyclic aliphatic groups, having from 1 to 20 carbon atoms;
f. aryl organic acids and their corresponding aryl organic anions and salts, having from 1 to 5 phenyl rings;
g. aliphatic alcohols, containing linear, branched, or cyclic aliphatic groups, having from 1 to 20 carbon atoms;
h. aryl alcohols having from 1 to 5 phenyl rings;
i. inorganic anions from the group consisting of:
   sulfate, nitrate, nitrite, sulfite, bisulfite, phosphate, hydrogen phosphate, dihydrogen phosphate, diphosphate, triphosphate, phosphite, chloride, chlorate, bromide, bromate, iodide, iodate, carbonate, bicarbonate, and the corresponding acids and salts of the aforementioned inorganic anions,
j. ammonia, carbon dioxide, methane, oxygen, ethylene, hexane, benzene, toluene, xylene, chlorobenzene, nitrobenzene, naphthalene, thiophene, pyridine, acetone, 1-2-dichloroethane, methylenechloride, tetrahydrofuran, ethanolamine, triethylamine and trifluoromethylsulfonic acid.

Further details regarding the at least bidentate organic compounds and the mono-dentate substances, from which the ligands of the framework material as used in the present application are derived, can be taken from EP-A 0 790 253, whose respective content is incorporated into the present application by reference.

Within the present application, framework materials of the kind described herein, which comprise $Zn^{2+}$ as a metal ion and ligands derived from terephthalic acid as the bidentate compound, are particularly preferred. Said framework materials are known as MOF-5 in the literature.

Further metal ions, at least bidentate organic compounds and mono-dentate substances, which are respectively useful for the preparation of the framework materials used in the present invention as well as processes for their preparation are particularly disclosed in EP-A 0 790 253, U.S. Pat. No. 5,648,508 and DE-A-101 11 230.

As solvents, which are particularly useful for the preparation of MOF-5, in addition to the solvents disclosed in the above-referenced literature, dimethyl formamide, diethyl formamide and N-methylpyrollidone, alone, in combination with each other or in combination with other solvents may be used. Within the preparation of the framework materials, particularly within the preparation of MOF-5, the solvents and mother liquors are recycled after crystallization in order to save costs and materials.

The pore sizes of the metal-organic framework can be adjusted by selecting suitable organic ligands and/or bidendate compounds (=linkers). Generally, the larger the linker the larger the pore size. Any pore size that is still supported by a MOF in the absence of a host and at temperatures of at least 200° C. is conceivable. Pore sizes ranging from 0.2 nm to 30 nm are preferred, with pore sizes ranging from 0.3 nm to 3 nm being particularly preferred.

With regard to the shaped bodies other pore sizes may occur. Preferably, more than 50% of the total pore volume, more preferred more than 75% of the total pore volume, is formed by pores having a pore diameter of up to 1000 nm.

Preferably, the bigger part of the pore volume is formed by pores coming from two distinct diameter ranges. Therefore, it is more preferred that more than 25%, even more preferred more than 50%, of the total pore volume is formed by pores having a diameter in the range of from 100 nm to 800 nm and that preferably more than 15%, even more preferred more than 25%, of the total pore volume is formed by pores having a diameter of up to 10 nm. The pore distribution can be determined by Hg-porosimetry (DIN 66133).

In the following, examples of metal-organic framework materials (MOFs) are given to illustrate the general concept given above. These specific examples, however, are not meant to limit the generality and scope of the present application.

By way of example, a list of metal-organic framework materials already synthesized and characterized is given below. This also includes novel isoreticular metal organic framework materials (IR-MOFs), which may be used in the framework of the present application. Such materials having the same framework topology while displaying different pore sizes and crystal densities are described, for example in M. Eddouadi et al., *Science* 295 (2002) 469, which is incorporated into the present application by reference.

The solvents used are of particular importance for the synthesis of these materials and are therefore mentioned in the table. The values for the cell parameters (angles $\alpha$, $\beta$ and $\gamma$ as well as the spacings a, b and c, given in Angstrom) have been obtained by x-ray diffraction and represent the space group given in the table as well.

| MOF-n | Ingredients molar ratios M + L | Solvents | α | β | γ | a | b | c | Space Group |
|---|---|---|---|---|---|---|---|---|---|
| MOF-0 | $Zn(NO_3)_2$•$6H_2O$<br>$H_3$(BTC) | ethanol | 90 | 90 | 120 | 16.711 | 16.711 | 14.189 | P6(3)/Mcm |
| MOF-2 | $Zn(NO_3)_2$•$6H_2O$<br>(0.246 mmol)<br>$H_2$(BDC)<br>0.241 mmol) | DMF<br>toluene | 90 | 102.8 | 90 | 6.718 | 15.49 | 12.43 | P2(1)/n |
| MOF-3 | $Zn(NO_3)_2$•$6H_2O$<br>(1.89 mmol)<br>$H_2$(BDC)<br>(1.93 mmol) | DMF<br>MeOH | 99.72 | 111.11 | 108.4 | 9.726 | 9.911 | 10.45 | P-1 |
| MOF-4 | $Zn(NO_3)_2$•$6H_2O$<br>(1.00 mmol)<br>$H_3$(BTC)<br>(0.5 mmol) | ethanol | 90 | 90 | 90 | 14.728 | 14.728 | 14.728 | P2(1)3 |
| MOF-5 | $Zn(NO_3)_2$•$6H_2O$<br>(2.22 mmol)<br>$H_2$(BDC)<br>(2.17 mmol) | DMF<br>chlorobenzene | 90 | 90 | 90 | 25.669 | 25.669 | 25.669 | Fm-3m |
| MOF-38 | $Zn(NO_3)_2$•$6H_2O$<br>(0.27 mmol)<br>$H_3$(BTC)<br>(0.15 mmol) | DMF<br>chlorobenzene | 90 | 90 | 90 | 20.657 | 20.657 | 17.84 | I4cm |
| MOF-31<br>$Zn(ADC)_2$ | $Zn(NO_3)_2$•$6H_2O$<br>0.4 mmol<br>$H_2$(ADC)<br>0.8 mmol | ethanol | 90 | 90 | 90 | 10.821 | 10.821 | 10.821 | Pn(−3)m |
| MOF-12<br>$Zn_2$(ATC) | $Zn(NO_3)_2$•$6H_2O$<br>0.3 mmol<br>$H_4$(ATC)<br>0.15 mmol | ethanol | 90 | 90 | 90 | 15.745 | 16.907 | 18.167 | Pbca |
| MOF-20<br>ZnNDC | $Zn(NO_3)_2$•$6H_2O$<br>0.37 mmol<br>$H_2$NDC<br>0.36 mmol | DMF<br>chlorobenzene | 90 | 92.13 | 90 | 8.13 | 16.444 | 12.807 | P2(1)/c |
| MOF-37 | $Zn(NO_3)_2$•$6H_2O$<br>0.2 mmol<br>$H_2$NDC<br>0.2 mmol | DEF<br>chlorobenzene | 72.38 | 83.16 | 84.33 | 9.952 | 11.576 | 15.556 | P-1 |
| MOF-8<br>$Tb_2$(ADC) | $Tb(NO_3)_3$•$5H_2O$<br>0.10 mmol<br>$H_2$ADC<br>0.20 mmol | DMSO<br>MeOH | 90 | 115.7 | 90 | 19.83 | 9.822 | 19.183 | C2/c |
| MOF-9<br>$Tb_2$(ADC) | $Tb(NO_3)_3$•$5H_2O$<br>0.08 mmol<br>$H_2$ADB<br>0.12 mmol | DMSO | 90 | 102.09 | 90 | 27.056 | 16.795 | 28.139 | C2/c |
| MOF-6 | $Tb(NO_3)_3$•$5H_2O$<br>0.30 mmol<br>$H_2$(BDC)<br>0.30 mmol | DMF<br>MeOH | 90 | 91.28 | 90 | 17.599 | 19.996 | 10.545 | P21/c |
| MOF-7 | $Tb(NO_3)_3$•$5H_2O$<br>0.15 mmol<br>$H_2$(BDC)<br>0.15 mmol | $H_2O$ | 102.3 | 91.12 | 101.5 | 6.142 | 10.069 | 10.096 | P-1 |
| MOF-69A | $Zn(NO_3)_2$•$6H_2O$<br>0.083 mmol<br>4,4'BPDC<br>0.041 mmol | DEF<br>$H_2O_2$<br>$MeNH_2$ | 90 | 111.6 | 90 | 23.12 | 20.92 | 12 | C2/c |
| MOF-69B | $Zn(NO_3)_2$•$6H_2O$<br>0.083 mmol<br>2,6-NCD<br>0.041 mmol | DEF<br>$H_2O_2$<br>$MeNH_2$ | 90 | 95.3 | 90 | 20.17 | 18.55 | 12.16 | C2/c |
| MOF-11<br>$Cu_2$(ATC) | $Cu(NO_3)_2$•$2.5H_2O$<br>0.47 mmol<br>$H_2$ATC<br>0.22 mmol | $H_2O$ | 90 | 93.86 | 90 | 12.987 | 11.22 | 11.336 | C2/c |
| MOF-11<br>$Cu_2$(ATC)<br>dehydr. | | | 90 | 90 | 90 | 8.4671 | 8.4671 | 14.44 | P42/mmc |
| MOF-14<br>$Cu_3$(BTB) | $Cu(NO_3)_2$•$2.5H_2O$<br>0.28 mmol<br>$H_3$BTB<br>0.052 mmol | $H_2O$<br>DMF<br>EtOH | 90 | 90 | 90 | 26.946 | 26.946 | 26.946 | Im-3 |

-continued

| MOF-n | Ingredients molar ratios M + L | Solvents | α | β | γ | a | b | c | Space Group |
|---|---|---|---|---|---|---|---|---|---|
| MOF-32 Cd(ATC) | $Cd(NO_3)_2$•$4H_2O$ 0.24 mmol $H_4ATC$ 0.10 mmol | $H_2O$ NaOH | 90 | 90 | 90 | 13.468 | 13.468 | 13.468 | P(−4)3m |
| MOF-33 $Zn_2(ATB)$ | $ZnCl_2$ 0.15 mmol $H_4ATB$ 0.02 mmol | $H_2O$ DMF EtOH | 90 | 90 | 90 | 19.561 | 15.255 | 23.404 | Imma |
| MOF-34 Ni(ATC) | $Ni(NO_3)_2$•$6H_2O$ 0.24 mmol $H_4ATC$ 0.10 mmol | $H_2O$ NaOH | 90 | 90 | 90 | 10.066 | 11.163 | 19.201 | $P2_12_12_1$ |
| MOF-36 $Zn_2(MTB)$ | $Zn(NO_3)_2$•$4H_2O$ 0.20 mmol $H_4MTB$ 0.04 mmol | $H_2O$ DMF | 90 | 90 | 90 | 15.745 | 16.907 | 18.167 | Pbca |
| MOF-39 $Zn_3O(HBTB)$ | $Zn(NO_3)_2$ $4H_2O$ 0.27 mmol $H_3BTB$ 0.07 mmol | $H_2O$ DMF EtOH | 90 | 90 | 90 | 17.158 | 21.591 | 25.308 | Pnma |
| NO305 | $FeCl_2$•$4H_2O$ 5.03 mmol formic acid 86.90 mmol | DMF | 90 | 90 | 120 | 8.2692 | 8.2692 | 63.566 | R-3c |
| NO306A | $FeCl_2$•$4H_2O$ 5.03 mmol formic acid 86.90 mmol | DEF | 90 | 90 | 90 | 9.9364 | 18.374 | 18.374 | Pbcn |
| NO29 MOF-0 like | $Mn(Ac)_2$•$4H_2O$ 0.46 mmol $H_3BTC$ 0.69 mmol | DMF | 120 | 90 | 90 | 14.16 | 33.521 | 33.521 | P-1 |
| BPR48A2 | $Zn(NO_3)_2$ $6H_2O$ 0.012 mmol $H_2BDC$ 0.012 mmol | DMSO toluene | 90 | 90 | 90 | 14.5 | 17.04 | 18.02 | Pbca |
| BPR69B1 | $Cd(NO_3)_2$ $4H_2O$ 0.0212 mmol $H_2BDC$ 0.0428 mmol | DMSO | 90 | 98.76 | 90 | 14.16 | 15.72 | 17.66 | Cc |
| BPR92A2 | $Co(NO_3)_2$•$6H_2O$ 0.018 mmol $H_2BDC$ 0.018 mmol | NMP | 106.3 | 107.63 | 107.2 | 7.5308 | 10.942 | 11.025 | P1 |
| BPR95C5 | $Cd(NO_3)_2$ $4H_2O$ 0.012 mmol $H_2BDC$ 0.36 mmol | NMP | 90 | 112.8 | 90 | 14.460 | 11.085 | 15.829 | P2(1)/n |
| $CuC_6H_4O_6$ | $Cu(NO_3)_2$•$2.5H_2O$ 0.370 mmol $H_2BDC(OH)_2$ 0.37 mmol | DMF chlorobenzene | 90 | 105.29 | 90 | 15.259 | 14.816 | 14.13 | P2(1)/c |
| M(BTC) MOF-0like | $Co(SO_4)$ $H_2O$ 0.055 mmol $H_3BTC$ 0.037 mmol | DMF | | Same as MOF-0 | | | | | |
| $Tb(C_6H_4O_6)$ | $Tb(NO_3)_3$•$5H_2O$ 0.370 mmol $H_2(C_6H_4O_6)$ 0.56 mmol | DMF chlorobenzene | 104.6 | 107.9 | 97.147 | 10.491 | 10.981 | 12.541 | P-1 |
| Zn $(C_2O_4)$ | $ZnCl_2$ 0.370 mmol oxalic acid 0.37 mmol | DMF chlorobenzene | 90 | 120 | 90 | 9.4168 | 9.4168 | 8.464 | P(−3)1m |
| Co(CHO) | $Co(NO_3)_2$•$5H_2O$ 0.043 mmol formic acid 1.60 mmol | DMF | 90 | 91.32 | 90 | 11.328 | 10.049 | 14.854 | P2(1)/n |
| Cd(CHO) | $Cd(NO_3)_2$•$4H_2O$ 0.185 mmol formic acid 0.185 mmol | DMF | 90 | 120 | 90 | 8.5168 | 8.5168 | 22.674 | R-3c |

-continued

| MOF-n | Ingredients<br>molar ratios<br>M + L | Solvents | α | β | γ | a | b | c | Space<br>Group |
|---|---|---|---|---|---|---|---|---|---|
| $Cu(C_3H_2O_4)$ | $Cu(NO_3)_2$•$2.5H_2O$<br>0.043 mmol<br>malonic acid<br>0.192 mmol | DMF | 90 | 90 | 90 | 8.366 | 8.366 | 11.919 | P43 |
| $Zn_6$<br>$(NDC)_5$<br>MOF-48 | $Zn(NO_3)_2$•$6H_2O$<br>0.097 mmol<br>14 NDC<br>0.069 mmol | DMF<br>chlorobenzene<br>$H_2O_2$ | 90 | 95.902 | 90 | 19.504 | 16.482 | 14.64 | C2/m |
| MOF-47 | $Zn(NO_3)_2$ $6H_2O$<br>0.185 mmol<br>$H_2(BDC[CH_3]_4)$<br>0.185 mmol | DMF<br>chlorobenzene<br>$H_2O_2$ | 90 | 92.55 | 90 | 11.303 | 16.029 | 17.535 | P2(1)/c |
| MO25 | $Cu(NO_3)_2$•$2.5H_2O$<br>0.084 mmol<br>BPhDC<br>0.085 mmol | DMF | 90 | 112.0 | 90 | 23.880 | 16.834 | 18.389 | P2(1)/c |
| Cu-Thio | $Cu(NO_3)_2$•$2.5H_2O$<br>0.084 mmol<br>thiophene<br>dicarboxylic<br>0.085 mmol | DEF | 90 | 113.6 | 90 | 15.4747 | 14.514 | 14.032 | P2(1)/c |
| ClBDC1 | $Cu(NO_3)_2$•$2.5H_2O$<br>0.084 mmol<br>$H_2(BDCCl_2)$<br>0.085 mmol | DMF | 90 | 105.6 | 90 | 14.911 | 15.622 | 18.413 | C2/c |
| MOF-<br>101 | $Cu(NO_3)_2$•$2.5H_2O$<br>0.084 mmol<br>BrBDC<br>0.085 mmol | DMF | 90 | 90 | 90 | 21.607 | 20.607 | 20.073 | Fm3m |
| $Zn_3(BTC)_2$ | $ZnCl_2$<br>0.033 mmol<br>$H_3BTC$<br>0.033 mmol | DMF<br>EtOH<br>base<br>added | 90 | 90 | 90 | 26.572 | 26.572 | 26.572 | Fm-3m |
| MOF-j | $Co(CH_3CO_2)_2$•$4H_2O$<br>(1.65 mmol)<br>$H_3(BZC)$<br>(0.95 mmol) | $H_2O$ | 90 | 112.0 | 90 | 17.482 | 12.963 | 6.559 | C2 |
| MOF-n | $Zn(NO_3)_2$•$6H_2O$<br>$H_3(BTC)$ | ethanol | 90 | 90 | 120 | 16.711 | 16.711 | 14.189 | P6(3)/mcm |
| PbBDC | $Pb(NO_3)_2$<br>(0.181 mmol)<br>$H_2(BDC)$<br>(0.181 mmol) | DMF<br>ethanol | 90 | 102.7 | 90 | 8.3639 | 17.991 | 9.9617 | P2(1)/n |
| Znhex | $Zn(NO_3)_2$•$6H_2O$<br>(0.171 mmol)<br>$H_3BTB$<br>(0.114 mmol) | DMF<br>p-<br>xylene<br>ethanol | 90 | 90 | 120 | 37.1165 | 37.117 | 30.019 | P3(1)c |
| AS16 | $FeBr_2$<br>0.927 mmol<br>$H_2(BDC)$<br>0.927 mmol | DMF<br>anhydr. | 90 | 90.13 | 90 | 7.2595 | 8.7894 | 19.484 | P2(1)c |
| AS27-2 | $FeBr_2$<br>0.927 mmol<br>$H_3(BDC)$<br>0.464 mmol | DMF<br>anhydr. | 90 | 90 | 90 | 26.735 | 26.735 | 26.735 | Fm3m |
| AS32 | $FeCl_3$<br>1.23 mmol<br>$H_2(BDC)$<br>1.23 mmol | DMF<br>anhydr.<br>ethanol | 90 | 90 | 120 | 12.535 | 12.535 | 18.479 | P6(2)c |
| AS54-3 | $FeBr_2$<br>0.927<br>BPDC<br>0.927 mmol | DMF<br>anhydr.<br>n-<br>propanol | 90 | 109.98 | 90 | 12.019 | 15.286 | 14.399 | C2 |
| AS61-4 | $FeBr_2$<br>0.927 mmol<br>m-BDC<br>0.927 mmol | pyridine<br>anhydr. | 90 | 90 | 120 | 13.017 | 13.017 | 14.896 | P6(2)c |
| AS68-7 | $FeBr_2$<br>0.927 mmol<br>m-BDC<br>1.204 mmol | DMF<br>anhydr.<br>Pyridine | 90 | 90 | 90 | 18.3407 | 10.036 | 18.039 | $Pca2_1$ |
| Zn(ADC) | $Zn(NO_3)_2$•$6H_2O$<br>0.37 mmol<br>$H_2(ADC)$<br>0.36 mmol | DMF<br>chlorobenzene | 90 | 99.85 | 90 | 16.764 | 9.349 | 9.635 | C2/c |

-continued

| MOF-n | Ingredients molar ratios M + L | Solvents | α | β | γ | a | b | c | Space Group |
|---|---|---|---|---|---|---|---|---|---|
| MOF-12 $Zn_2$(ATC) | $Zn(NO_3)_2$•$6H_2O$ 0.30 mmol $H_4$(ATC) 0.15 mmol | ethanol | 90 | 90 | 90 | 15.745 | 16.907 | 18.167 | Pbca |
| MOF-20 ZnNDC | $Zn(NO_3)_2$•$6H_2O$ 0.37 mmol $H_2$NDC 0.36 mmol | DMF chlorobenzene | 90 | 92.13 | 90 | 8.13 | 16.444 | 12.807 | P2(1)/c |
| MOF-37 | $Zn(NO_3)_2$•$6H_2O$ 0.20 mmol $H_2$NDC 0.20 mmol | DEF chlorobenzene | 72.38 | 83.16 | 84.33 | 9.952 | 11.576 | 15.556 | P-1 |
| Zn(NDC) (DMSO) | $Zn(NO_3)_2$•$6H_2O$ $H_2$NDC | DMSO | 68.08 | 75.33 | 88.31 | 8.631 | 10.207 | 13.114 | P-1 |
| Zn(NDC) | $Zn(NO_3)_2$•$6H_2O$ $H_2$NDC | | 90 | 99.2 | 90 | 19.289 | 17.628 | 15.052 | C2/c |
| Zn(HPDC) | $Zn(NO_3)_2$•$4H_2O$ 0.23 mmol $H_2$(HPDC) 0.05 mmol | DMF $H_2O$ | 107.9 | 105.06 | 94.4 | 8.326 | 12.085 | 13.767 | P-1 |
| Co(HPDC) | $Co(NO_3)_2$•$6H_2O$ 0.21 mmol $H_2$(HPDC) 0.06 mmol | DMF $H_2O$/ ethanol | 90 | 97.69 | 90 | 29.677 | 9.63 | 7.981 | C2/c |
| $Zn_3$(PDC)2.5 | $Zn(NO_3)_2$•$4H_2O$ 0.17 mmol $H_2$(HPDC) 0.05 mmol | DMF/ CIBz $H_20$/ TEA | 79.34 | 80.8 | 85.83 | 8.564 | 14.046 | 26.428 | P-1 |
| $Cd_2$ (TPDC)2 | $Cd(NO_3)_2$•$4H_2O$ 0.06 mmol $H_2$(HPDC) 0.06 mmol | methanol/ CHP $H_2O$ | 70.59 | 72.75 | 87.14 | 10.102 | 14.412 | 14.964 | P-1 |
| Tb(PDC)1.5 | $Tb(NO_3)_3$•$5H_2O$ 0.21 mmol $H_2$(PDC) 0.034 mmol | DMF $H_2O$/ ethanol | 109.8 | 103.61 | 100.14 | 9.829 | 12.11 | 14.628 | P-1 |
| ZnDBP | $Zn(NO_3)_2$•$6H_2O$ 0.05 mmol dibenzylphosphate 0.10 mmol | MeOH | 90 | 93.67 | 90 | 9.254 | 10.762 | 27.93 | P2/n |
| $Zn_3$(BPDC) | $ZnBr_2$ 0.021 mmol 4,4'BPDC 0.005 mmol | DMF | 90 | 102.76 | 90 | 11.49 | 14.79 | 19.18 | P21/n |
| CdBDC | $Cd(NO_3)_2$•$4H_2O$ 0.100 mmol $H_2$(BDC) 0.401 mmol | DMF $Na_2SiO_3$ (aq) | 90 | 95.85 | 90 | 11.2 | 11.11 | 16.71 | P21/n |
| Cd-mBDC | $Cd(NO_3)_2$•$4H_2O$ 0.009 mmol $H_2$(mBDC) 0.018 mmol | DMF $MeNH_2$ | 90 | 101.1 | 90 | 13.69 | 18.25 | 14.91 | C2/c |
| $Zn_4$OBNDC | $Zn(NO_3)_2$•$6H_2O$ 0.041 mmol BNDC | DEF $MeNH_2$ $H_2O_2$ | 90 | 90 | 90 | 22.35 | 26.05 | 59.56 | Fmmm |
| Eu(TCA) | $Eu(NO_3)_3$•$6H_2O$ 0.14 mmol TCA 0.026 mmol | DMF chloro benzene | 90 | 90 | 90 | 23.325 | 23.325 | 23.325 | Pm-3n |
| Tb(TCA) | $Tb(NO_3)_3$•$6H_2O$ 0.069 mmol TCA 0.026 mmol | DMF chlorobenzene | 90 | 90 | 90 | 23.272 | 23.272 | 23.372 | Pm-3n |
| Formate | $Ce(NO_3)_3$•$6H_2O$ 0.138 mmol Formaic acid 0.43 mmol | $H_2O$ ethanol | 90 | 90 | 120 | 10.668 | 10.667 | 4.107 | R-3m |
| | $FeCl_2$•$4H_2O$ 5.03 mmol Formic acid 86.90 mmol | DMF | 90 | 90 | 120 | 8.2692 | 8.2692 | 63.566 | R-3c |
| | $FeCl_2$•$4H_2O$ 5.03 mmol Formic acid 86.90 mmol | DEF | 90 | 90 | 90 | 9.9364 | 18.374 | 18.374 | Pbcn |

-continued

| MOF-n | Ingredients molar ratios M + L | Solvents | α | β | γ | a | b | c | Space Group |
|---|---|---|---|---|---|---|---|---|---|
| | $FeCl_2$•$4H_2O$ 5.03 mmol Formic acid 86.90 mmol | DEF | 90 | 90 | 90 | 8.335 | 8.335 | 13.34 | P-31c |
| NO330 | $FeCl_2$•$4H_2O$ 0.50 mmol Formic acid 8.69 mmol | formamide | 90 | 90 | 90 | 8.7749 | 11.655 | 8.3297 | Pnna |
| NO332 | $FeCl_2$•$4H_2O$ 0.50 mmol Formic acid 8.69 mmol | DIP | 90 | 90 | 90 | 10.0313 | 18.808 | 18.355 | Pbcn |
| NO333 | $FeCl_2$•$4H_2O$ 0.50 mmol Formic acid 8.69 mmol | DBF | 90 | 90 | 90 | 45.2754 | 23.861 | 12.441 | Cmcm |
| NO335 | $FeCl_2$•$4H_2O$ 0.50 mmol Formic acid 8.69 mmol | CHF | 90 | 91.372 | 90 | 11.5964 | 10.187 | 14.945 | P21/n |
| NO336 | $FeCl_2$•$4H_2O$ 0.50 mmol Formic acid 8.69 mmol | MFA | 90 | 90 | 90 | 11.7945 | 48.843 | 8.4136 | Pbcm |
| NO13 | $Mn(Ac)_2$•$4H_2O$ 0.46 mmol Bezoic acid 0.92 mmol Bipyridine 0.46 mmol | ethanol | 90 | 90 | 90 | 18.66 | 11.762 | 9.418 | Pbcn |
| NO29 MOF-0 Like | $Mn(Ac)_2$•$4H_2O$ 0.46 mmol $H_3BTC$ 0.69 mmol | DMF | 120 | 90 | 90 | 14.16 | 33.521 | 33.521 | P-1 |
| $Mn(hfac)_2$ $(O_2CC_6H_5)$ | $Mn(Ac)_2$•$4H_2O$ 0.46 mmol Hfac 0.92 mmol Bipyridine 0.46 mmol | ether | 90 | 95.32 | 90 | 9.572 | 17.162 | 14.041 | C2/c |
| BPR43G2 | $Zn(NO_3)_2$•$6H_2O$ 0.0288 mmol $H_2BDC$ 0.0072 mmol | DMF $CH_3CN$ | 90 | 91.37 | 90 | 17.96 | 6.38 | 7.19 | C2/c |
| BPR48A2 | $Zn(NO_3)_2$ $6H_2O$ 0.012 mmol $H_2BDC$ 0.012 mmol | DMSO toluene | 90 | 90 | 90 | 14.5 | 17.04 | 18.02 | Pbca |
| BPR49B1 | $Zn(NO_3)_2$ $6H_2O$ 0.024 mmol $H_2BDC$ 0.048 mmol | DMSO methanol | 90 | 91.172 | 90 | 33.181 | 9.824 | 17.884 | C2/c |
| BPR56E1 | $Zn(NO_3)_2$ $6H_2O$ 0.012 mmol $H_2BDC$ 0.024 mmol | DMSO n-propanol | 90 | 90.096 | 90 | 14.5873 | 14.153 | 17.183 | P2(1)/n |
| BPR68D10 | $Zn(NO_3)_2$ $6H_2O$ 0.0016 mmol $H_3BTC$ 0.0064 mmol | DMSO benzene | 90 | 95.316 | 90 | 10.0627 | 10.17 | 16.413 | P2(1)/c |
| BPR69B1 | $Cd(NO_3)_2$ $4H_2O$ 0.0212 mmol $H_2BDC$ 0.0428 mmol | DMSO | 90 | 98.76 | 90 | 14.16 | 15.72 | 17.66 | Cc |
| BPR73E4 | $Cd(NO_3)_2$ $4H_2O$ 0.006 mmol $H_2BDC$ 0.003 mmol | DMSO toluene | 90 | 92.324 | 90 | 8.7231 | 7.0568 | 18.438 | P2(1)/n |
| BPR76D5 | $Zn(NO_3)_2$ $6H_2O$ 0.0009 mmol $H_2BzPDC$ 0.0036 mmol | DMSO | 90 | 104.17 | 90 | 14.4191 | 6.2599 | 7.0611 | Pc |

-continued

| MOF-n | Ingredients molar ratios M + L | Solvents | α | β | γ | a | b | c | Space Group |
|---|---|---|---|---|---|---|---|---|---|
| BPR80B5 | $Cd(NO_3)_2•4H_2O$ 0.018 mmol $H_2BDC$ 0.036 mmol | DMF | 90 | 115.11 | 90 | 28.049 | 9.184 | 17.837 | C2/c |
| BPR80H5 | $Cd(NO_3)_2$ $4H_2O$ 0.027 mmol $H_2BDC$ 0.027 mmol | DMF | 90 | 119.06 | 90 | 11.4746 | 6.2151 | 17.268 | P2/c |
| BPR82C6 | $Cd(NO_3)_2$ $4H_2O$ 0.0068 mmol $H_2BDC$ 0.202 mmol | DMF | 90 | 90 | 90 | 9.7721 | 21.142 | 27.77 | Fdd2 |
| BPR86C3 | $Co(NO_3)_2$ $6H_2O$ 0.0025 mmol $H_2BDC$ 0.075 mmol | DMF | 90 | 90 | 90 | 18.3449 | 10.031 | 17.983 | Pca2(1) |
| BPR86H6 | $Cd(NO_3)_2•6H_2O$ 0.010 mmol $H_2BDC$ 0.010 mmol | DMF | 80.98 | 89.69 | 83.412 | 9.8752 | 10.263 | 15.362 | P-1 |
| | $Co(NO_3)_2$ $6H_2O$ | NMP | 106.3 | 107.63 | 107.2 | 7.5308 | 10.942 | 11.025 | P1 |
| BPR95A2 | $Zn(NO_3)_2$ $6H_2O$ 0.012 mmol $H_2BDC$ 0.012 mmol | NMP | 90 | 102.9 | 90 | 7.4502 | 13.767 | 12.713 | P2(1)/c |
| $CuC_6F_4O_4$ | $Cu(NO_3)_2•2.5H_2O$ 0.370 mmol $H_2BDC(OH)_2$ 0.37 mmol | DMF chloro-benzene | 90 | 98.834 | 90 | 10.9675 | 24.43 | 22.553 | P2(1)/n |
| Fe Formic | $FeCl_2•4H_2O$ 0.370 mmol Formic acid 0.37 mmol | DMF | 90 | 91.543 | 90 | 11.495 | 9.963 | 14.48 | P2(1)/n |
| Mg Formic | $Mg(NO_3)_2•6H_2O$ 0.370 mmol Formic acid 0.37 mmol | DMF | 90 | 91.359 | 90 | 11.383 | 9.932 | 14.656 | P2(1)/n |
| $MgC_6H_4O_6$ | $Mg(NO_3)_2•6H_2O$ 0.370 mmol $H_2BDC(OH)_2$ 0.37 mmol | DMF | 90 | 96.624 | 90 | 17.245 | 9.943 | 9.273 | C2/c |
| Zn $C_2H_4BDC$ MOF-38 | $ZnCl_2$ 0.44 mmol CBBDC 0.261 mmol | DMF | 90 | 94.714 | 90 | 7.3386 | 16.834 | 12.52 | P2(1)/n |
| MOF-49 | $ZnCl_2$ 0.44 mmol m-BDC 0.261 mmol | DMF CH3CN | 90 | 93.459 | 90 | 13.509 | 11.984 | 27.039 | P2/c |
| MOF-26 | $Cu(NO_3)_2•5H_2O$ 0.084 mmol DCPE 0.085 mmol | DMF | 90 | 95.607 | 90 | 20.8797 | 16.017 | 26.176 | P2(1)/n |
| MOF-112 | $Cu(NO_3)_2•2.5H_2O$ 0.084 mmol o-Br-m-BDC 0.085 mmol | DMF ethanol | 90 | 107.49 | 90 | 29.3241 | 21.297 | 18.069 | C2/c |
| MOF-109 | $Cu(NO_3)_2•2.5H_2O$ 0.084 mmol KDB 0.085 mmol | DMF | 90 | 111.98 | 90 | 23.8801 | 16.834 | 18.389 | P2(1)/c |
| MOF-111 | $Cu(NO_3)_2•2.5H_2O$ 0.084 mmol o-BrBDC 0.085 mmol | DMF ethanol | 90 | 102.16 | 90 | 10.6767 | 18.781 | 21.052 | C2/c |
| MOF-110 | $Cu(NO_3)_2•2.5H_2O$ 0.084 mmol thiophene dicarboxylic 0.085 mmol | DMF | 90 | 90 | 120 | 20.0652 | 20.065 | 20.747 | R-3/m |

-continued

| MOF-n | Ingredients molar ratios M + L | Solvents | α | β | γ | a | b | c | Space Group |
|---|---|---|---|---|---|---|---|---|---|
| MOF-107 | $Cu(NO_3)_2•2.5H_2O$ 0.084 mmol thiophene dicarboxylic 0.085 mmol | DEF | 104.8 | 97.075 | 95.206 | 11.032 | 18.067 | 18.452 | P-1 |
| MOF-108 | $Cu(NO_3)_2•2.5H_2O$ 0.084 mmol thiophene dicarboxylic 0.085 mmol | DBF/ methanol | 90 | 113.63 | 90 | 15.4747 | 14.514 | 14.032 | C2/c |
| MOF-102 | $Cu(NO_3)_2•2.5H_2O$ 0.084 mmol $H_2(BDCCl_2)$ 0.085 mmol | DMF | 91.63 | 106.24 | 112.01 | 9.3845 | 10.794 | 10.831 | P-1 |
| Clbdc1 | $Cu(NO_3)_2•2.5H_2O$ 0.084 mmol $H_2(BDCCl_2)$ 0.085 mmol | DEF | 90 | 105.56 | 90 | 14.911 | 15.622 | 18.413 | P-1 |
| Cu(NMOP) | $Cu(NO_3)_2•2.5H_2O$ 0.084 mmol NBDC 0.085 mmol | DMF | 90 | 102.37 | 90 | 14.9238 | 18.727 | 15.529 | P2(1)/m |
| Tb(BTC) | $Tb(NO_3)_3•5H_2O$ 0.033 mmol $H_3BTC$ 0.033 mmol | DMF | 90 | 106.02 | 90 | 18.6986 | 11.368 | 19.721 | |
| $Zn_3(BTC)_2$ Honk | $ZnCl_2$ 0.033 mmol $H_3BTC$ 0.033 mmol | DMF ethanol | 90 | 90 | 90 | 26.572 | 26.572 | 26.572 | Fm-3m |
| $Zn_4O(NDC)$ | $Zn(NO_3)_2•4H_2O$ 0.066 mmol 14NDC 0.066 mmol | DMF ethanol | 90 | 90 | 90 | 41.5594 | 18.818 | 17.574 | aba2 |
| CdTDC | $Cd(NO_3)_2•4H_2O$ 0.014 mmol thiophene 0.040 mmol DABCO 0.020 mmol | DMF $H_2O$ | 90 | 90 | 90 | 12.173 | 10.485 | 7.33 | Pmma |
| IRMOF-2 | $Zn(NO_3)_2•4H_2O$ 0.160 mmol o-Br-BDC 0.60 mmol | DEF | 90 | 90 | 90 | 25.772 | 25.772 | 25.772 | Fm-3m |
| IRMOF-3 | $Zn(NO_3)_2•4H_2O$ 0.20 mmol $H_2N$-BDC 0.60 mmol | DEF ethanol | 90 | 90 | 90 | 25.747 | 25.747 | 25.747 | Fm-3m |
| IRMOF-4 | $Zn(NO_3)_2•4H_2O$ 0.11 mmol $[C_3H_7O]_2$-BDC 0.48 mmol | DEF | 90 | 90 | 90 | 25.849 | 25.849 | 25.849 | Fm-3m |
| IRMOF-5 | $Zn(NO_3)_2•4H_2O$ 0.13 mmol $[C_5H_{11}O]_2$-BDC 0.50 mmol | DEF | 90 | 90 | 90 | 12.882 | 12.882 | 12.882 | Pm-3m |
| IRMOF-6 | $Zn(NO_3)_2•4H_2O$ 0.20 mmol $[C_2H_4]$-BDC 0.60 mmol | DEF | 90 | 90 | 90 | 25.842 | 25.842 | 25.842 | Fm-3m |
| IRMOF-7 | $Zn(NO_3)_2•4H_2O$ 0.07 mmol 1,4NDC 0.20 mmol | DEF | 90 | 90 | 90 | 12.914 | 12.914 | 12.914 | Pm-3m |
| IRMOF-8 | $Zn(NO_3)_2•4H_2O$ 0.55 mmol 2,6NDC 0.42 mmol | DEF | 90 | 90 | 90 | 30.092 | 30.092 | 30.092 | Fm-3m |
| IRMOF-9 | $Zn(NO_3)_2•4H_2O$ 0.05 mmol BPDC 0.42 mmol | DEF | 90 | 90 | 90 | 17.147 | 23.322 | 25.255 | Pnnm |

-continued

| MOF-n | Ingredients molar ratios M + L | Solvents | α | β | γ | a | b | c | Space Group |
|---|---|---|---|---|---|---|---|---|---|
| IRMOF-10 | $Zn(NO_3)_2 \cdot 4H_2O$ 0.02 mmol BPDC 0.012 mmol | DEF | 90 | 90 | 90 | 34.281 | 34.281 | 34.281 | Fm-3m |
| IRMOF-11 | $Zn(NO_3)_2 \cdot 4H_2O$ 0.05 mmol HPDC 0.20 mmol | DEF | 90 | 90 | 90 | 24.822 | 24.822 | 56.734 | R-3m |
| IRMOF-12 | $Zn(NO_3)_2 \cdot 4H_2O$ 0.017 mmol HPDC 0.12 mmol | DEF | 90 | 90 | 90 | 34.281 | 34.281 | 34.281 | Fm-3m |
| IRMOF-13 | $Zn(NO_3)_2 \cdot 4H_2O$ 0.048 mmol PDC 0.31 mmol | DEF | 90 | 90 | 90 | 24.822 | 24.822 | 56.734 | R-3m |
| IRMOF-14 | $Zn(NO_3)_2 \cdot 4H_2O$ 0.17 mmol PDC 0.12 mmol | DEF | 90 | 90 | 90 | 34.381 | 34.381 | 34.381 | Fm-3m |
| IRMOF-15 | $Zn(NO_3)_2 \cdot 4H_2O$ 0.063 mmol TPDC 0.025 mmol | DEF | 90 | 90 | 90 | 21.459 | 21.459 | 21.459 | Im-3m |
| IRMOF-16 | $Zn(NO_3)_2 \cdot 4H_2O$ 0.0126 mmol TPDC 0.05 mmol | DEF NMP | 90 | 90 | 90 | 21.49 | 21.49 | 21.49 | Pm-3m |

ADC Acetylene dicarboxylic acid
NDC Naphtalene dicarboxylic acid
BDC Benzene dicarboxylic acid
ATC Adamantane tetracarboxylic acid
BTC Benzene tricarboxylic acid
BTB Benzene tribenzoate
MTB Methane tetrabenzoate
ATB Adamantane tetrabenzoate
ADB Adamantane dibenzoate
Other MOFs known in the art are MOF-177 and MOF-178.

Examples for the synthesis of these materials in form of a powder can, for example, be found in: U.S. Pat. No. 5,648,508, J. Am. Chem. Soc. 123 (2001) pages 8241 seq. or in Acc. Chem. Res. 31 (1998) pages 474 seq., which are fully encompassed within the content of the present application with respect to their respective content.

The separation of the framework materials, particularly of MOF-5, from the mother liquor of the crystallization may be achieved by procedures known in the art such as solid-liquid separations, centrifugation, extraction, filtration, membrane filtration, cross-flow filtration, flocculation using flocculation adjuvants (non-ionic, cationic and anionic adjuvants) or by the addition of pH shifting additives such as salts, acids or bases, by flotation, as well as by evaporation of the mother liquor at elevated temperature and/or in vacuo and concentrating of the solid.

Besides conventional methods for the preparation of MOFs a new electrochemical way is disclosed in German patent application N° 103 55 087.9 as well as in international application N° PCT/EP2004/013236. The new MOFs show excellent properties in relation to the storage of liquefied gases. Therefore, the use of these MOFs according to the present invention is preferred.

The term "electrochemical preparation" as employed within the scope of the present invention relates to a preparation method in which the formation of at least one reaction product is attendant on the migration of electrical charges or the occurrence of electrical potentials.

The term "at least one metal ion" as used within the scope of the present invention and subject to the electrochemical formation of MOFs relates to embodiments according to which at least one ion of a metal or at least one ion of a first metal and at least one ion of at least one second metal differing from the first metal are provided by anodic oxidation.

Accordingly, the present invention comprises embodiments in which at least one ion of at least one metal is provided via anodic oxidation and at least one ion of at least one metal is provided via a metal salt, where the at least one metal in the metal salt and the at least one metal provided via anodic oxidation as a metal ion can be identical or different from one another. The present invention therefore comprises, for example, an embodiment according to which the reaction medium comprises one or more different salts of a metal and the metal ion present in this salt or these salts is additionally provided via anodic oxidation of at least one anode containing said metal. Likewise, the present invention comprises an embodiment according to which the reaction medium comprises one or more different salts of at least one metal and at least one metal different from these metals is provided via anodic oxidation as a metal ion in the reaction medium.

According to a preferred embodiment of the present invention and in relation to the electrochemical preparation of MOFs, the at least one metal ion is provided via anodic oxidation of at least one anode containing said at least one metal, no further metal being provided via a metal salt.

The term "metal" as used within the scope of the present invention in relation to the electrochemical preparation of MOFs comprises all those elements of the Periodic Table of the Elements which can be provided in a reaction medium via anodic oxidation via an electrochemical route and are able to form at least one metal-organic, porous framework material with at least one at least bidentate organic compound.

As mentioned above, irrespective of being derived by conventional or electrochemical methods the use of MOFs as shaped bodies is preferred according to the present invention.

Appropriate processes of molding a powder are known to the person skilled in the art, referring, in the broadest sense, to a process, wherein i.e. any powder, powdery substance, array of crystallites etc., can be formed into a shaped body that is stable under the conditions of its intended use.

In addition to the optional molding step of a MOF containing powder into a shaped body the following steps may also occur according to the present invention:

(I) the molding may be preceded by a step of mixing, (II) the molding may be preceded by a step of preparing a paste-like mass or a fluid containing the MOF containing powder, for example by adding solvents, binders or other additional substances, (III) the molding may be followed by a step of finishing, in particular a step of drying.

The conversion step of molding, shaping or forming and the like may be achieved by any method known to an expert to achieve agglomeration of a powder, a suspension or a paste-like mass. Such methods are described, for example, in Ullmann's Enzylopädie der Technischen Chemie, $4^{th}$ Edition, Vol. 2, p. 313 et seq., 1972, whose respective content is incorporated into the present application by reference.

In general, the following main pathways can be discerned: (i) briquetting, i.e. mechanical pressing of the powdery material, with or without binders and/or other additives, (ii) granulating (pelletizing), i.e. compacting of moistened powdery materials by subjecting it to rotating movements, and (iii) sintering, i.e. subjecting the material to be compacted to a thermal treatment. The latter is somewhat limited for the material according to the invention due to the limited temperature stability of the organic materials (see below).

Specifically, the molding step according to the invention is preferably performed by using at least one method selected from the following group: briquetting by piston presses, briquetting by roller pressing, binderless briquetting, briquetting with binders, pelletizing, compounding, melting, extruding, co-extruding, spinning, deposition, foaming, spray drying, coating, granulating, in particular spray granulating or granulating according to any process known within the processing of plastics or any combination of at least two of the aforementioned methods.

The molding may be affected by extrusion in conventional extruders, for example such that result in extrudates having a diameter of, usually, from about 1 to about 10 mm, in particular from about 1.5 to about 5 mm. Such extrusion apparatuses are described, for example, in Ullmann's Enzylopädie der Technischen Chemie, 4th Edition, Vol. 2, p. 295 et seq., 1972. In addition to the use of an extruder, an extrusion press is preferably also used for molding.

The preferred process of molding is performed at elevated pressure, i.e. by pressing of the MOF containing powder. The pressure may range from atmospheric pressure to several 100 bar. Also elevated temperatures (ranging from room temperature to 300° C.) or in a protective atmosphere (noble gases, nitrogen or mixtures thereof) are suitable. Any combination of these conditions is possible as well.

The conditions under which the pressing may be accomplished depend on, e.g. the press, the filling height, the press capacity, and the form of the shaped body.

The step of molding can be performed in the presence of binders and/or other additional substances that stabilize the materials to be agglomerated. As to the at least one optional binder, any material known to an expert to promote adhesion between the particles to be molded together can be employed. A binder, an organic viscosity-enhancing compound and/or a liquid for converting the material into a paste can be added to the metal-organic framework material, with the mixture being subsequently compacted in a mixing or kneading apparatus or an extruder. The resulting plastic material can then be molded, in particular using an extrusion press or an extruder, and the resulting moldings can then be subjected to the optional step (III) of finishing, for example drying.

A number of inorganic compounds can be used as binders. Non-limiting examples include titanium dioxide, hydrated titanium dioxide, hydrated alumina or other aluminum-containing binders, mixtures of silicon and aluminum compounds, silicon compounds, clay minerals, alkoxysilanes, and amphiphilic substances.

Other conceivable binders are in principle all compounds used to date for the purpose of achieving adhesion in powdery materials. Compounds, in particular oxides, of silicon, of aluminum, of boron, of phosphorus, of zirconium and/or of titanium are preferably used. Of particular interest as a binder is silica, where the $SiO_2$ may be introduced into the shaping step as a silica sol or in the form of tetraalkoxysilanes. Oxides of magnesium and of beryllium and clays, for example montmorillonites, kaolins, bentonites, halloysites, dickites, nacrites and anauxites, may furthermore be used as binders. Tetraalkoxysilanes are particularly used as binders in the present invention. Specific examples are tetramethoxysilane, tetraethoxysilane, tetrapropoxysilane and tetrabutoxysilane, the analogous tetraalkoxytitanium and tetraalkoxyzirconium compounds and trimethoxy-, triethoxy-, tripropoxy- and tributoxy-aluminum, tetramethoxysilane and tetraethoxysilane being particularly preferred.

The binder may have a concentration of from 0.1 to 20% by weight. Alternatively, no binder is used.

One or more mold release agent may be present as additives. Suitable agents are graphite or MOF materials, where the MOF has a layer composition.

In addition, organic viscosity-enhancing substances and/or hydrophilic polymers, e.g. cellulose or polyacrylates may be used. The organic viscosity-enhancing substance used may likewise be any substance suitable for this purpose. Those preferred are organic, in particular hydrophilic polymers, e.g., cellulose, starch, polyacrylates, polymethacrylates, polyvinyl alcohol, polyvinylpyrrolidone, polyisobutene and polytetrahydrofuran. These substances primarily promote the formation of a plastic material during the kneading, molding and drying step by bridging the primary particles and moreover ensuring the mechanical stability of the molding during the molding and the optional drying process.

There are no restrictions at all with regard to the optional liquid which may be used to create a paste-like substance, either for the optional step (I) of mixing or for the step of molding. In addition to water, alcohols may be used, provided that they are water-miscible. Accordingly, both monoalcohols of 1 to 4 carbon atoms and water-miscible polyhydric alcohols may be used. In particular, methanol, ethanol, propanol, n-butanol, isobutanol, tert-butanol and mixtures of two or more thereof are used.

Amines or amine-like compounds, for example tetraalkylammonium compounds or aminoalcohols, and carbonate-containing substances, such as calcium carbonate, may be used as further additives. Such further additives are described in EP-A 0 389 041, EP-A 0 200 260 and WO 95/19222, which are incorporated fully by reference in the context of the present application.

Most, if not all, of the additive substances mentioned above may be removed from the shaped bodies by drying or heating, optionally in a protective atmosphere or under vacuum. In order to keep the metal-organic framework intact, the shaped bodies are preferably not exposed to temperatures exceeding 300° C. However, studies show that heating/drying under the aforementioned mild conditions, in particular drying in vacuo, preferably well below 300° C. is sufficient to at least remove organic compounds out of the pores of the metal-organic framework. Generally, the conditions are adapted and chosen depending upon the additive substances used.

The order of addition of the components (optional solvent, binder, additives, metal-organic framework material) is not critical. It is possible either to add first the binder, then, for example, the metal-organic framework material and, if required, the additive and finally the mixture containing at least one alcohol and/or water or to interchange the order with respect to any of the aforementioned components.

As far as the optional step (I) of mixing is concerned, for example, of the powder containing a metal-organic framework and a binder and optionally further process materials (=additional materials), all methods known to the expert in the fields of materials processing and unit operations can be used. If the mixing occurs in the liquid phase, stirring is preferred, if the mass to be mixed is paste-like, kneading and/or extruding are preferred and if the components to be mixed are all in a solid, powdery state, mixing is preferred. The use of atomizers, sprayers, diffusers or nebulizers is conceivable as well if the state of the components to be used allows the use thereof. For paste-like (originating from MOF containing powder) and powder-like materials the use of static mixers, planetary mixers, mixers with rotating containers, pan mixers, pug mills, shearing-disk mixers, centrifugal mixers, sand mills, trough kneaders, internal mixers, internal mixers and continuous kneaders are preferred. It is explicitly included that a process of mixing may be sufficient to achieve the molding, i.e., that the steps of mixing and molding coincide.

EXAMPLES

Example 1

Figure 2:
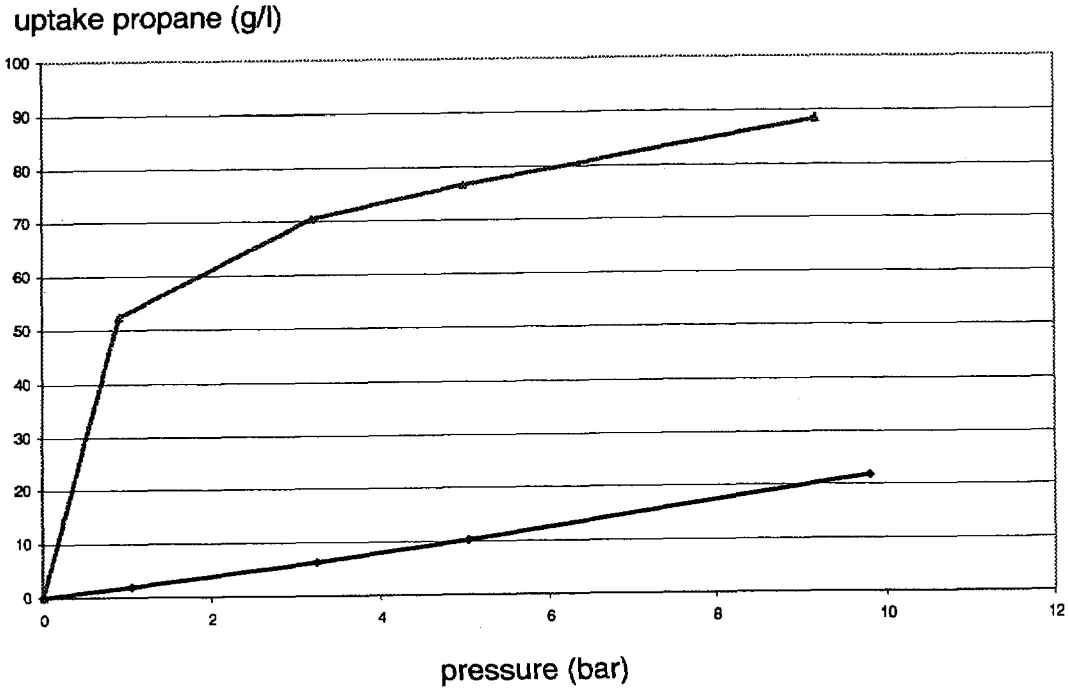

FIG. 2 shows the curves for the uptake of propane in a bottle (volume 0.5 1) at room temperature with and without MOF. The MOF used in this example is Zn-MOF-5. The preparation of that MOF is described in US 2003/0148165 A1.

The ratios of the pressures with/without MOF at certain uptake values are shown in table 1.

TABLE 1

| | | | |
|---|---|---|---|
| Uptake propane (g/l container without MOF) | 6.32 | 10.16 | 30.5 |
| Pressure of container without MOF ($=p_{empty}$) in bar | 3.244 | 5.036 | 9.808 |
| Necessary pressure of container with MOF for the same uptake ($=p_{MOF}$) in bar | 0.107 | 0.161 | 0.324 |
| $\frac{p_{MOF}}{p_{empty}}$ | 0.03 | 0.03 | 0.03 |

Example 2

Figure 3:
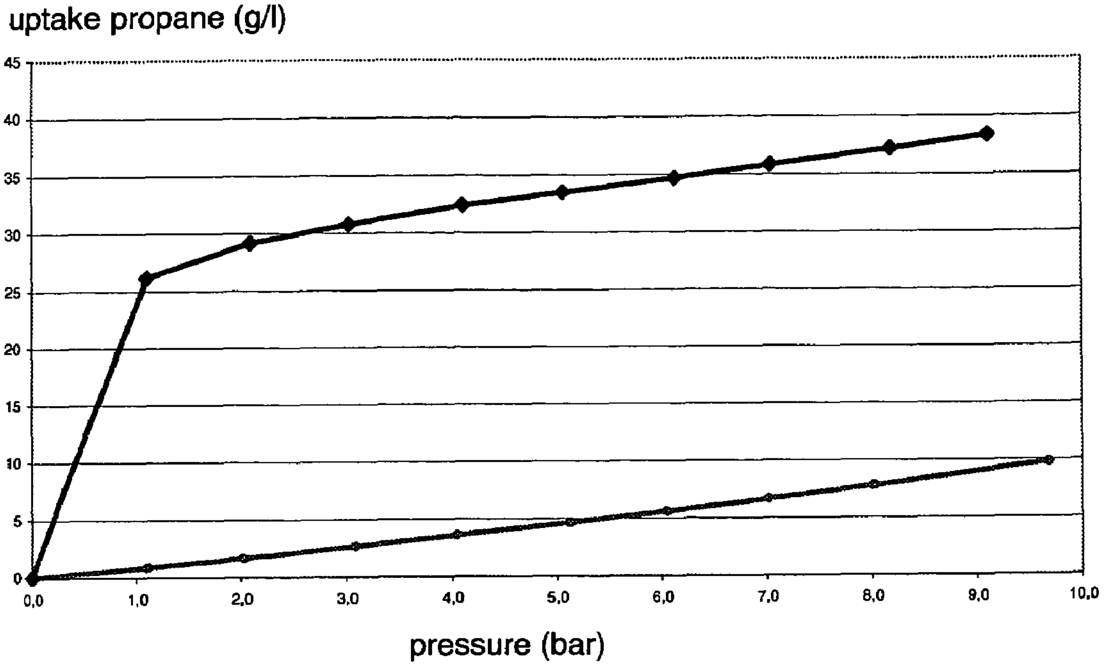

FIG. 3 shows the curves for the uptake of propane in a bottle (volume 0.477 1) at room temperature with and without MOF. The MOF used in this example is IRMOF-8. The preparation of that MOP is described in WO-A 02/088148.

The ratios of the pressures with/without MOF at certain uptake values are shown in table 2.

TABLE 2

| | | | | |
|---|---|---|---|---|
| Uptake propane (g/l container without MOF) | 3.5 | 9.77 | 16.29 | 20.57 |
| Pressure of container without MOF ($=p_{empty}$) in bar | 2.023 | 5.121 | 8.012 | 9.681 |
| Necessary pressure of container with MOF for the same uptake ($=p_{MOF}$) in bar | 0.090 | 0.203 | 0.315 | 0.408 |
| $\frac{p_{MOF}}{p_{empty}}$ | 0.04 | 0.04 | 0.04 | 0.04 |

The invention claimed is:

1. A method of storing a gas selected from the group consisting of halogenated $C_1$-$C_{10}$ hydrocarbon, propane, butane, isobutane and mixtures thereof in a container having an entrance opening and optionally a separate exit opening for allowing the gas to enter or exit the container and a gas-tight maintaining mechanism capable of maintaining the gas in its gaseous state in a predefined amount and under a predefined pressure inside the container and containing a metal-organic framework material (MOF) comprising at least one metal ion and at least one at least bidentate organic compound, which is coordinately bound to said metal ion, wherein the ratio of the pressure in the container to a pressure necessary for the storage of the same amount of gas at the same temperature in the container without comprising the MOF is at most 0.2.

2. The method of claim 1, wherein the gas is propane.

3. The method of claim 1, wherein the container is of a non-cylindrical shape.

4. The method of claim 1, wherein the pressure is more than 0.1 bar and less than 20 bar.

5. The method of claim 1, wherein the amount of gas is at least 2 g/l.

6. The method of claim 1, wherein the ratio is at most 0.1.

7. A container filled with a gas selected from the group consisting of halogenated $C_1$-$C_{10}$ hydrocarbon, propane, butane, isobutane and mixtures thereof in a predefined amount and under a predefined pressure having an entrance opening and optionally a separate exit opening for allowing the gas to enter or exit the container and a gas-tight maintaining mechanism capable of maintaining the gas in its gaseous state in a predefined amount and under a predefined pressure inside the container and containing a metal-organic framework material (MOF) comprising at least one metal ion and at least one at least bidentate organic compound, which is coordinately bound to said metal ion, wherein the ratio of the pressure in the container to a pressure necessary for the storage of the same amount of gas at the same temperature in the container without comprising the MOF is at most 0.2.

8. A process for filling a container having an entrance opening and optionally a separate exit opening for allowing a gas selected from the group consisting of halogenated $C_1$-$C_{10}$ hydrocarbon, propane, butane, isobutane and mixtures thereof to enter or exit the container and a gas-tight maintaining mechanism capable of maintaining the gas in its gaseous state inside the container and containing a metal-organic framework material (MOF) comprising at least one metal ion and at least one at least bidentate organic compound, which is coordinately bound to said metal ion, with a gas up to a predefined amount and a predefined pressure so that the ratio of the pressure in the container to a pressure necessary for the storage of the same amount of gas at the same temperature in the container without comprising the MOF is at most 0.2, comprising the step contacting the entrance opening of the container with a bottle of the gas, wherein the gas is in its liquid state or compressed state, such that the pressure in the feed container exceeds the pressure in the container which is to be filled.

9. A method comprising releasing a gas under controlled conditions from a container according to claim 7.

* * * * *